(12) United States Patent
Zhao et al.

(10) Patent No.: US 11,480,531 B2
(45) Date of Patent: Oct. 25, 2022

(54) AUTOMATIC ASSESSMENT METHOD AND ASSESSMENT SYSTEM THEREOF FOR YIELD IMPROVEMENT

(71) Applicant: Yangtze Memory Technologies Co., Ltd., Wuhan (CN)

(72) Inventors: Ge Ge Zhao, Wuhan (CN); Fei Wang, Wuhan (CN); Zheng Yi Cai, Wuhan (CN); Ling Ling Fu, Wuhan (CN); Tao Huang, Wuhan (CN); Xing Jin, Wuhan (CN); Jing Yun Wu, Wuhan (CN); Yadong Wang, Wuhan (CN)

(73) Assignee: Yangtze Memory Technologies Co., Ltd., Wuhan (CN)

(*) Notice: Subject to any disclaimer, the term of this patent is extended or adjusted under 35 U.S.C. 154(b) by 385 days.

(21) Appl. No.: 16/726,275

(22) Filed: Dec. 24, 2019

(65) Prior Publication Data

US 2021/0140897 A1    May 13, 2021

Related U.S. Application Data

(63) Continuation of application No. PCT/CN2019/116814, filed on Nov. 8, 2019.

(51) Int. Cl.
  *G01N 21/95* (2006.01)
  *G01N 21/88* (2006.01)
  *G06Q 10/06* (2012.01)

(52) U.S. Cl.
  CPC ..... *G01N 21/9501* (2013.01); *G01N 21/8851* (2013.01); *G06Q 10/0639* (2013.01); *G06T 2207/30148* (2013.01)

(58) Field of Classification Search
  CPC ........... G01N 21/8851; G01N 21/9501; G06Q 10/0639; G06T 2207/30148
  (Continued)

(56) References Cited

U.S. PATENT DOCUMENTS 6,744,266 B2   6/2004  Dor
8,537,349 B2   9/2013  Huet
(Continued)

FOREIGN PATENT DOCUMENTS

CN         1392954 A    1/2003
CN       101246831 A    8/2008
(Continued)

*Primary Examiner* — John H Le
(74) *Attorney, Agent, or Firm* — Winston Hsu

(57) ABSTRACT

An assessment system includes a storage device and a processing circuit. The processing circuit is coupled to the storage device and configured to execute the instructions stored in the storage device. The storage device is configured for storing instructions of extracting at least one feature parameter corresponding to at least one defect detected on an object respectively; determining at least one feature evaluation according to the at least one feature parameter respectively; weighting the at least one feature evaluation to calculate at least one weighted feature evaluation respectively; summing the at least one weighted feature evaluation to calculate at least one total score corresponding to at least one lesson-learnt case; and ranking the at least one total score corresponding to the at least one lesson-learnt case to find out a suspected root cause corresponding to one of the at least one lesson-learnt case with higher priority.

20 Claims, 3 Drawing Sheets

(58) Field of Classification Search
USPC .......................................................... 702/81
See application file for complete search history.

(56) References Cited

U.S. PATENT DOCUMENTS

| | | | | |
|---|---|---|---|---|
| 10,430,719 | B2 * | 10/2019 | David | ................... H01L 22/14 |
| 2008/0163140 | A1 | 7/2008 | Fouquet | |
| 2009/0185739 | A1 | 7/2009 | Amini | |
| 2014/0212021 | A1 | 7/2014 | Amzaleg | |
| 2017/0269985 | A1 * | 9/2017 | Xiao | ................ G06F 16/24578 |
| 2020/0372034 | A1 * | 11/2020 | Jedrzejewski | ......... G06Q 10/10 |

FOREIGN PATENT DOCUMENTS

| | | | |
|---|---|---|---|
| CN | 101847163 | A | 9/2010 |
| CN | 102576045 | A | 7/2012 |
| CN | 103295930 | A | 9/2013 |
| CN | 106104575 | A | 11/2016 |
| CN | 107203450 | A | 9/2017 |
| CN | 107636450 | A | 1/2018 |
| CN | 108898051 | A | 11/2018 |
| CN | 109946320 | A | 6/2019 |
| CN | 110109821 | A | 8/2019 |
| CN | 110243834 | A | 9/2019 |
| EP | 1069609 | A2 | 1/2001 |
| JP | 4220595 | | 2/2009 |
| TW | 200912582 | | 3/2009 |
| TW | 201301074 | A1 | 1/2013 |
| TW | 201329909 | A1 | 7/2013 |
| TW | 201411760 | A | 3/2014 |
| TW | 201516598 | A | 5/2015 |
| TW | 201837631 | A | 10/2018 |

* cited by examiner

ALERT

Y009B at AAA Layer suffer Scratch Defect issue defect count map    defect map        Die Stack Map Typical image       AA-01 Layer Scratch defect trend chart @AAA layer TE department defect trend chart @AAA layer Key Point:
- default product symbol = Y009
- default layer symbol = AAA
- default defect code = scratch
- default defect map = arc
- default defect count = 3
- default fault detection and classification = N/A
- default tool status = N/A
- default offline monitor data = N/A
- default lesson-learnt case status = indefinite
- Die Stack Map is Random
- AA-01 Layer data is OK Impact:
- 1 wafer(s) and/or 5 lot(s) are impacted
- impact level = 4.82%

Action:
- YE department: instruct CMP department to check equipment ATUNA01-5
- YE department: instruct EE department to clean equipment ATUNA01-5
- YE department: instruct EE department to trace post 7 lots

FIG. 3

AUTOMATIC ASSESSMENT METHOD AND ASSESSMENT SYSTEM THEREOF FOR YIELD IMPROVEMENT

CROSS REFERENCE TO RELATED APPLICATIONS

This application is a continuation of International Application No. PCT/CN2019/116814 filed on Nov. 8, 2019, which is incorporated herein by reference in its entirety.

BACKGROUND OF THE INVENTION

1. Field of the Invention

The present invention relates to an automatic assessment method and an assessment system, and more particularly, to an assessment method and an assessment system to improve product yield by preventing yield loss, reducing cycle-time, minimizing impacts on subsequent fabrication processes, and increasing product reliability and accuracy, etc.

2. Description of the Prior Art

Defects, especially major ones, affect both the formation and functions of an object such as semiconductor products for industrial application. These are types of defects which are noticeable—for example, scratches, cracks, uneven thickness, and dislocations, which may be caused intrinsically by process tools, fab environment, raw materials, precursor gases and/or extrinsically by processes, mistake operation, and so on. Apart from monitoring the health of process line and inline products by detecting defects and specifying their locations, finding out root cause of the defects should play an incrementally important role in the manufacture industry.

SUMMARY OF THE INVENTION

The present invention therefore provides an automatic assessment method and an assessment system to monitor defects, thereby preventing yield loss, improving cycle-time, minimizing impacts on subsequent fabrication processes, and increasing reliability and accuracy, and so on.

An embodiment of the present application discloses an assessment system includes a storage device and a processing circuit. The processing circuit is coupled to the storage device and configured to execute the instructions stored in the storage device. The storage device is configured for storing instructions of extracting at least one feature parameter corresponding to at least one defect detected on an object respectively; determining at least one feature evaluation according to the at least one feature parameter respectively; weighting at least one feature evaluation to calculate at least one weighted feature evaluation respectively; summing the at least one weighted feature evaluation to calculate at least one total score corresponding to at least one lesson-learnt case; and ranking the at least one total score corresponding to the at least one lesson-learnt case to find out a suspected root cause corresponding to one of the at least one lesson-learnt case with higher priority.

An embodiment of the present application discloses an assessment method includes extracting at least one feature parameter corresponding to at least one defect detected on an object respectively; determining at least one feature evaluation according to the at least one feature parameter respectively; weighting the at least one feature evaluation to calculate at least one weighted feature evaluation respectively; summing the at least one weighted feature evaluation to calculate at least one total score corresponding to at least one lesson-learnt case; and ranking the at least one total score corresponding to the at least one lesson-learnt case to find out a suspected root cause corresponding to one of the at least one lesson-learnt case with higher priority.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of an alert in the assessment system of FIG. 1.

DETAILED DESCRIPTION

Figure 1:
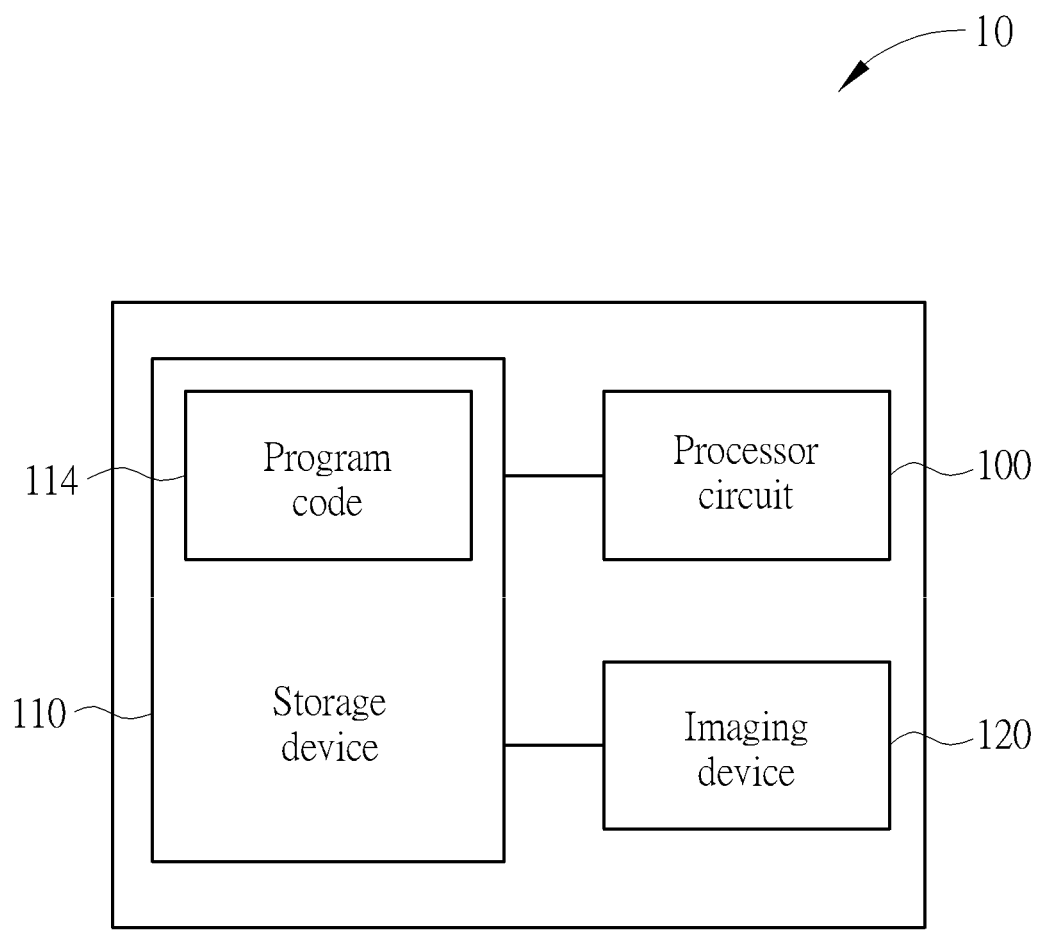
FIG. 1 is a schematic diagram of an assessment system according to an example of the present invention.

FIG. 1 is a schematic diagram of an assessment system 10 according to an example of the present invention. The assessment system 10 may include a processor circuit 100, a storage device 110 and an imaging device 120. The processor circuit 100 may be microprocessor or Application Specific Integrated Circuit (ASIC), but not limited thereto. The storage device 110 maybe any data storage device which is able to store a program code 114 and database(s) to be accessed and executed by the processor circuit 100. Examples of the storage device 110 may be read-only memory (ROM), flash memory, random-access memory (RAM), hard disk, optical data storage device, non-volatile storage device, non-transitory computer-readable medium, but not limited thereto. The imaging device 120 may be optical microscope, scanning electron microscope (SEM), detectors, or other devices which can image an object for the processor circuit 100 to process.

Figure 2:
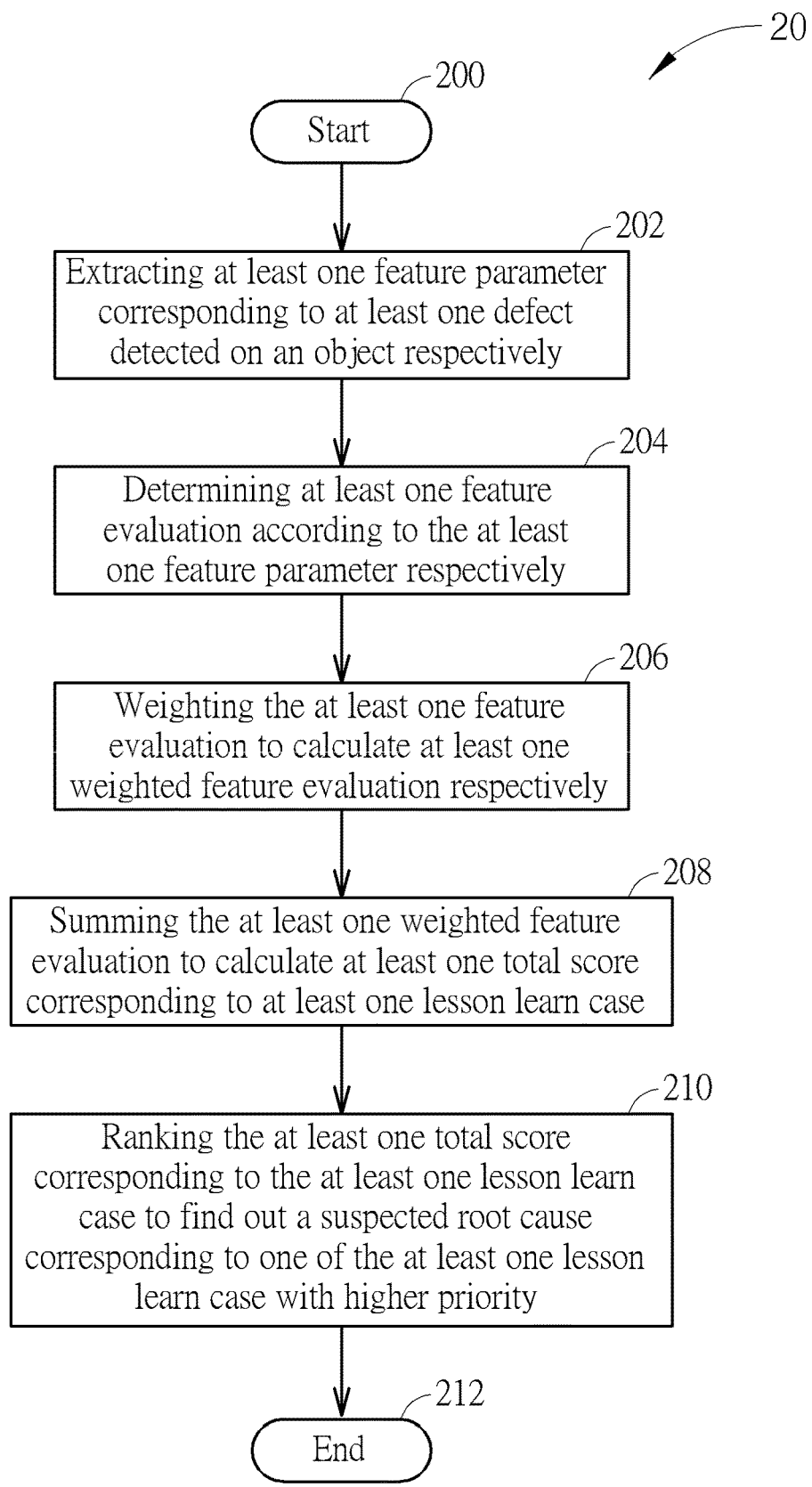
FIG. 2 is a flowchart of an assessment method of according to an example of the present invention.

FIG. 2 is a flowchart of an assessment method 20 according to an example of the present invention. The assessment method 20 may be compiled into the program code 114 and utilized in the assessment system 10. The assessment method 20 includes following steps:

Step 200: Start.

Step 202: Extracting at least one featured parameter corresponding to at least one defect detected on an object.

Step 204: Determining at least one feature evaluation according to the at least one feature parameter respectively.

Step 206: Weighting the at least one feature evaluation to calculate at least one weighted feature evaluation respectively.

Step 208: Summing the at least one weighted feature evaluation to calculate at least one total score corresponding to at least one lesson-learnt case.

Step 210: Ranking the at least one total score corresponding to the at least one lesson-learnt case to find out a suspected root cause corresponding to one of the at least one lesson-learnt case with higher priority.

Step 212: End.

Briefly, the assessment system 10 of the present invention adopts feature extraction to obtain feature parameter (s) and achieves data retrieval and data matching rapidly in big data analysis with the database stored in the storage device 110 of the assessment system 10. Detecting defects, analyzing the most suspected root cause(s) of the defects and notifying appropriate personnel automatically according to the assessment method 20 could result in preventing yield loss, improving cycle-time, minimizing the impact on subsequent fabrication processes, and increasing reliability and accuracy.

Specifically, after a defect is found, the defect is then inspected and classified so as to specify the equipment and process which caused the defect. In Step 202, the at least one feature parameter corresponding to the at least one defect is extracted. The at least one feature parameter corresponding to the at least one defect detected is critical information for judgments of root cause(s) of the at least one defect detected. The at least one feature parameter corresponding to the at least one defect detected may be a detective product symbol, a detective layer symbol, a detective defect code, a detective defect map, a detective defect count, a detective fault detection and classification (FDC), a detective tool status, or a detective offline monitor data.

In some embodiments, the imaging device 120 of the assessment system 10 maybe utilized to make a visual representation of an object, for example, a wafer, in Step 202. In some embodiments, a layout pattern with defect(s) is captured by the imaging device 120. The assessment system 10 recognizes the defect(s) by comparing the layout pattern with a desired layout pattern without defects. When a difference between the layout pattern and the desired layout pattern exceeds a preset threshold, the defect(s) is recognized. Feature parameter(s) corresponding to the defect(s) of the object is then extracted from the layout pattern. In some embodiments, information of the layout pattern with the defect(s) is quantified or digitized to generate the feature parameter(s). In some embodiments, the position(s) of the defect(s) on the object is recorded to obtain the feature parameter(s) in Step 202.

Corresponding to the at least one feature parameter, a lesson-learnt case may include at least one predetermined parameter. In the database, which is stored in the storage device 110 of the assessment system 10, there are a plurality of lesson-learnt cases. The at least one predetermined parameter in one of the lesson-learnt cases may be a default product symbol, a default layer symbol, a default defect code, a default defect map, a default defect count, a default FDC, a default tool status, a default offline monitor data, or a default lesson-learnt case status.

In Step 204, the at least one feature evaluation is determined according to the at least one feature parameter respectively. Furthermore, the at least one predetermined parameter in one of the lesson-learnt cases (e.g., a lesson-learnt case one) may also affect the at least one feature evaluation. Each of the at least one feature evaluation is related to a similarity between one of the at least one feature parameter and one of the at least one default feature parameter respectively. In Step 206, the at least one feature evaluation is multiplied by at least one feature weighting to calculate the at least one weighted feature evaluation respectively. Step 204 to Step 206 may be further detailed as follows.

To clarify further, please refer to Table 1. Table 1 shows a comparison between an ongoing lesson-learnt case not established yet and another lesson-learnt case (e.g., the lesson-learnt case one), which is recorded in the database, in the assessment system 10 of FIG. 1. The ongoing lesson-learnt case corresponds to the at least one defect which is detected in the assessment method 20.

TABLE 1 a comparison between an ongoing lesson-learnt case (not established yet) and a recorded lesson-learnt case (e.g., the lesson-learnt case one) total score corresponding to the lesson-learnt case one = 15

| feature parameter | feature evaluation | feature weighting | weighted feature evaluation |
|---|---|---|---|
| detective product symbol = Y009 | product symbol evaluation = 1 | product symbol weighting = 0.5 | weighted product symbol evaluation = 0.5 |
| detective layer symbol = AAA | layer symbol evaluation = 1 | layer symbol weighting = 0.5 | weighted layer symbol evaluation = 1 |
| detective defect code = scratch | defect code evaluation = 1 | defect code weighting = 3 | weighted defect code evaluation = 1 |
| detective defect map = arc | defect map evaluation = 1 | defect map weighting = 5 | weighted defect map evaluation = 1 |
| detective defect count = 3 | defect count evaluation = 3 | defect count weighting = 1 | weighted defect count evaluation = 3 |
| detective fault detection and classification = N/A | fault detection and classification evaluation = 1 | fault detection and classification weighting = 1 | weighted fault detection and classification evaluation = 1 |
| detective tool status = N/A | tool status evaluation = 0 | tool status weighting = 10 | weighted tool status evaluation = 0 |
| detective offline monitor data = N/A | offline monitor data evaluation = 0 | offline monitor data weighting = 7 | weighted offline monitor data evaluation = 0 |
| default lesson-learnt case status = indefinite | lesson-learnt case status evaluation = 0.5 | lesson-learnt case status weighting = 4 | weighted lesson-learnt case status evaluation = 0.5 |

The detective product symbol may be associated with the object, which may be a wafer with a specific IC design. As the IC design differs, the detective product symbol is changed. The detective product symbol may be, for example but not limited thereto, Y009. If the default product symbol is also Y009, a product symbol evaluation calculated in Step 204 would be, for example but not limited thereto, 1. In other words, the magnitude of the product symbol evaluation is based on the similarity between detective product symbol and the default product symbol. The product symbol evaluation is then multiplied by the appropriate weighting (i.e., a product symbol weighting) and the result is a weighted product symbol evaluation in Step 206. The exact value of the product symbol weighting depends on the importance of product symbol evaluation.

The detective layer symbol may be associated with the location(s) of the defect(s). The location(s) of the defect is highly related to equipment failure or process failure. Because a wafer may have a multi-layered stacked structure, a defect may be found in any layer. The detective layer symbol indicates the layer where the defect (s) is located. The detective layer symbol may be, for example but not limited thereto, V1 CMP (or AAA). If the default layer symbol is also V1 CMP (or AAA), a layer symbol evaluation calculated in Step 204 would be, for example but not limited thereto, 1. In other words, the magnitude of the layer symbol evaluation is based on the similarity between detective layer symbol and the default layer symbol. The layer symbol evaluation is then multiplied by the appropriate weighting (i.e., a layer symbol weighting) and the result is a weighted layer symbol evaluation in Step 206. The exact value of the layer symbol weighting depends on the importance of the layer symbol evaluation.

The detective defect code may be associated with the type of the defect(s). For example, the detective defect code may indicate scratch or impurity, but not limited thereto. If both the detective defect code and the default defect code are scratch, a defect code evaluation calculated in Step 204 would be, for example but not limited thereto, 1. In other words, the magnitude of the defect code evaluation is based on the similarity between detective defect code and the default defect code. The defect code evaluation is then multiplied by the appropriate weighting (i.e., a defect code weighting) and the result is a weighted defect code evaluation in Step 206. The exact value of the defect code weighting depends on the importance of the defect code evaluation.

The detective defect map may be associated with the shape or the size of the defect(s). In some embodiments, the detective defect map may indicate arc or triangle. In some embodiments, the detective defect map may indicate the distance between two opposite edges of a defect. If both the detective defect map and the default defect map are arc, a defect map evaluation calculated in Step 204 would be, for example but not limited thereto, 1. In other words, the magnitude of the defect map evaluation is based on the similarity between detective defect map and the default defect map. The defect map evaluation is then multiplied by the appropriate weighting (i.e., a defect map weighting) and the result is a weighted defect map evaluation in Step 206. The exact value of the defect map weighting depends on the importance of the defect map evaluation.

The detective defect count may be associated with the number of the defect(s) of the layout patterns. The magnitude of a defect count evaluation calculated in Step 204 equals the number of the defect(s) in a layout pattern. The defect count evaluation may be multiplied by the appropriate weighting (i.e., a defect count weighting) and the result is a weighted defect count evaluation in Step 206. The exact value of the defect count weighting depends on the importance of the defect count evaluation.

The detective FDC may be associated with process excursions. Sensor data, which come from equipment and are monitored continuously, may be analyzed against user defined limits to detect process excursions. Process excursions may be a result of one or more of a degrading equipment part of the ongoing step, or a process or equipment issue from any of the previous steps. For example, sensor data such as radio frequency power may increase when discharge in equipment undergoes a glow-to-arc transition. If both the detective FDC and the default FDC indicate certain process excursion(s) or no obvious process excursion, a FDC evaluation calculated in Step 204 would be, for example but not limited thereto, 1. In other words, the magnitude of the FDC evaluation is based on the similarity between detective FDC and the default FDC. The FDC evaluation is then multiplied by the appropriate weighting (i.e., a FDC weighting) and the result is a weighted FDC evaluation in Step 206. The exact value of the FDC weighting depends on the importance of the FDC evaluation.

The detective tool status may be associated with equipment status of the ongoing step or any of the previous steps. For instance, if certain equipment is going to be repaired or have just been maintained, equipment status may very likely imperfect. If the default tool status indicates certain maintenance events as well, a tool status evaluation calculated in Step 204 would be, for example but not limited thereto, 1. In other words, the magnitude of the tool status evaluation is based on the similarity between detective tool status and the default tool status. The tool status evaluation is then multiplied by the appropriate weighting (i.e., a tool status weighting) and the result is a weighted tool status evaluation in Step 206. The exact value of the tool status weighting depends on the importance of the tool status evaluation.

The detective offline monitor data may be associated with equipment failure. Specifically, a fabrication procedure composed of many repeated sequential processes to produce a product such as a wafer is also applied to a test sample. Online monitor data result from the fabrication procedure for a product. On the other hand, when the fabrication procedure is employed for the test sample, offline monitor data maybe generated. Accordingly, the offline monitor data may directly reflect specific equipment failure(s). If the default offline monitor data indicates certain equipment failure(s) for test sample(s) as well, an offline monitor data evaluation calculated in Step 204 would be, for example but not limited thereto, 1. In other words, the magnitude of the offline monitor data evaluation is based on the similarity between detective offline monitor data and the default offline monitor data. The offline monitor data evaluation is then multiplied by the appropriate weighting (i.e., an offline monitor data weighting) and the result is a weighted offline monitor data evaluation in Step 206. The exact value of the offline monitor data weighting depends on the importance of the offline monitor data evaluation.

The default lesson-learnt case status may be associated with diagnosis reliability, accuracy or definiteness of a lesson-learnt case (e.g., a lesson-learnt case one shown in Table 1 and Table 2). For example, certain lesson-learnt case(s) may not have enough evidences to make a definite conclusion about the root cause of a defect; however, the lesson-learnt case(s) may suggest that certain root cause is most likely to be true. In such a situation, the more unambiguous the judgment from the lesson-learnt case one is, the higher a lesson-learnt case status evaluation would be. In other words, the magnitude of the defect count evaluation calculated in Step 204 is based on the diagnosis definiteness of the lesson-learnt case one. The lesson-learnt case status evaluation is then multiplied by the appropriate weighting (i.e., a lesson-learnt case status weighting) and the result is a weighted lesson-learnt case status evaluation in Step 206. The exact value of the lesson-learnt case status weighting depends on the importance of the lesson-learnt case status evaluation.

In Step 208, the total score corresponding to a (recorded) lesson-learnt case (e.g., the lesson-learnt case one) is the sum of the weighted feature evaluations. For instance, the product symbol evaluation, the layer symbol evaluation, the defect code evaluation, the defect map evaluation, the defect count evaluation, the FDC evaluation, the tool status evaluation, the offline monitor data evaluation, the lesson-learnt case status evaluation may be 1, 1, 1, 1, 3, 1, 0, 0, and 0.5 respectively. The product symbol weighting, the layer symbol weighting, the defect code weighting, the defect map weighting, the defect count weighting, the FDC weighting, the tool status weighting, the offline monitor data weighting, the lesson-learnt case status weighting may be 0.5, 0.5, 3, 5, 1, 1, 10, 7, and 4 respectively. The weighted product symbol evaluation, the weighted layer symbol evaluation, the weighted defect code evaluation, the weighted defect map evaluation, the weighted defect count evaluation, the weighted FDC evaluation, the weighted tool status evaluation, the weighted offline monitor data evaluation, and the weighted lesson-learnt case status evaluation may then be 0.5 (0.5=0.5*1), 0.5 (0.5=0.5*1), 3 (3=3*1), 5 (5=5*1), 3 (3=1*3), 1 (1=1*1), 0 (0=10*0), 0 (0=7*0), and 2 (2=4*0.5) respectively.

By summing all the weighted feature evaluations, the total score corresponding to the (recorded) lesson-learnt case (e.g., the lesson-learnt case one) is calculated. For example, the total score corresponding to the (recorded) lesson-learnt case one may be obtained by adding the weighted product symbol evaluation, the weighted layer symbol evaluation, the weighted defect code evaluation, the weighted defect map evaluation, the weighted defect count evaluation, the weighted FDC evaluation, the weighted tool status evaluation, the weighted offline monitor data evaluation, and the weighted lesson-learnt case status evaluation together. That makes 15.

The rankings of all the lesson-learnt cases are calculated according to their corresponding total scores respectively in Step 210. In such manner, a suspected root cause corresponding to one of the at least one lesson-learnt case with higher priority is determined. For instance, the (recorded) lesson-learnt case one winning the total score of 15 indicates the manufacturing process problem probably occurs during the arc discharge process, which is regarded as a proposed root cause. A total score corresponding to a (recorded) lesson-learnt case two, which is recorded in the database, is 45, and the lesson-learnt case two indicates the manufacturing process problem probably occurs during diamond blade, which is regarded as a proposed root cause. A total score corresponding to a (recorded) lesson-learnt case three is 7, and the lesson-learnt case three indicates the manufacturing process problem probably occurs during the Chemical Mechanical Polishing/Planarization (CMP) process, which is regarded as a proposed root cause. A total score corresponding to a (recorded) lesson-learnt case four is 13, and the lesson-learnt case four indicates the manufacturing process problem probably occurs during the annealing process, which is regarded as a proposed root cause.

Since the lesson-learnt case two is scored higher than the others, the most suspected root cause maybe diamond blade. To clarify Step 210 further, please refer to Table 2. Table 2 shows information about all the (recorded) lesson-learnt cases in the assessment system 10 of FIG. 1. Although only the lesson-learnt case one to the lesson-learnt case four is shown, the present invention is not limited thereto, and the number of lesson-learnt cases may alter.

TABLE 2

| recorded lesson-learnt case | total score | proposed root cause | execution equipment |
|---|---|---|---|
| lesson-learnt case two | 45 | diamond blade | cutting equipment YND3 |
| lesson-learnt case one | 15 | arc discharge process | arc discharge equipment 282SFD13 |
| lesson-learnt case four | 13 | annealing process | N/A |
| lesson-learnt case three | 7 | Chemical Mechanical Polishing/Planarization process | Chemical Mechanical Polishing/Planarizaton equipment ATUNA01-5 |

According to the most suspected root cause incticatect by the lesson-learnt case two, the specific execution equipment to perform the diamond blade process is sorted out to be the cutting equipment YND3. In some embodiments, alerts about the most suspected root cause may be issued automatically to inform users or technicians, and the suspected root cause (for example, the unreliability of the cutting equipment YND3 with the diamond blade) indicates why the at least one defect occurs. Alerts may be edited automatically by the assessment system 10 to indicate the most suspected root cause and to provide detailed information of the at least one feature parameter corresponding to the detected defect. It allows engineers to configure actions that must be taken when a defect is detected. To clarify further, please refer to FIG. 3. FIG. 3 is a schematic diagram of an alert in the assessment system 10 of FIG. 1.In some embodiments, the assessment system 10 may automatically takes preset actions. Detecting such defects, analyzing the most suspected root cause(s) and notifying appropriate personnel automatically could result in preventing yield loss, improving cycle-time, minimizing the impact on subsequent fabrication processes, and increasing reliability and accuracy.

In some embodiments, the ongoing lesson-learnt case shown in Table 1 and FIG. 3 becomes a new lesson-learnt case. In some embodiments, the detailed information of the at least one feature parameter corresponding to the defect(s) presently detected and/or the most suspected root cause may be established as anew lesson-learnt case. The new lesson-learnt case would be saved in the database in the storage device 110 of the assessment system 10. In other words, the database of the assessment system 10 is dynamic, and may change at run time.

In some embodiments, the most suspected root cause judged by the assessment system 10 (according to the lesson-learnt case two) may be compared to a possible root cause judged by the manual inspection with human eyes. The determination accuracy of the assessment system 10 is calculated. If the determination accuracy of the assessment system 10 is higher than the determination accuracy of the manual inspection, users may be notified with an alert about the most suspected root cause automatically. In this manner, cycle time is reduced, impacts on subsequent fabrication processes are reduced, and the accuracy is promoted.

The feature weighting may be determined in a sophisticated way. Specifically, please refer to Table 3 to Table 5. Table 3 shows a comparison between an (ongoing) lesson-learnt case not established yet and another (recorded) lesson-learnt case (e.g., the lesson-learnt case one), which is recorded in the database, in the assessment system 10 of FIG. 1 with un-optimized feature weightings. Table 4 shows information about all the (recorded) lesson-learnt cases in the assessment system 10 of FIG. 1. Table 5 again shows a comparison between the ongoing lesson-learnt case not established yet and the recorded lesson-learnt case in the assessment system 10 of FIG. 1 with optimized feature weightings.

TABLE 3 a comparison between an ongoing lesson-learnt case (not established yet) and a recorded lesson-learnt case (e.g., the lesson-learnt case one) total score corresponding to the lesson-learnt case one = 15

| feature parameter | feature evaluation | feature weighting | weighted feature evaluation |
|---|---|---|---|
| detective product symbol = Y009 | product symbol evaluation = 1 | product symbol weighting = 1 | weighted product symbol evaluation = 1 |
| detective layer symbol = AAA | layer symbol evaluation = 1 | layer symbol weighting = 1 | weighted layer symbol evaluation = 1 |
| detective defect code = scratch | defect code evaluation = 1 | defect code weighting = 1 | weighted defect code evaluation = 1 |

TABLE 3-continued a comparison between an ongoing lesson-learnt case (not established yet)
and a recorded lesson-learnt case (e.g., the lesson-learnt case one)
total score corresponding to the lesson-learnt case one = 15

| feature parameter | feature evaluation | feature weighting | weighted feature evaluation |
|---|---|---|---|
| detective defect map = arc | defect map evaluation = 1 | defect map weighting = 1 | weighted defect map evaluation = 1 |
| detective defect count = 3 | defect count evaluation = 3 | defect count weighting = 1 | weighted defect count evaluation = 3 |
| detective fault detection and classification = N/A | fault detection and classification evaluation = 1 | fault detection and classification weighting = 1 | weighted fault detection and classification evaluation = 1 |
| detective tool status = N/A | tool status evaluation = 0 | tool status weighting = 1 | weighted tool status evaluation = 0 |
| detective offline monitor data = N/A | offline monitor data evaluation = 0 | offline monitor data weighting = 1 | weighted offline monitor data evaluation = 0 |
| default lesson-learnt case status = indefinite | lesson-learnt case status evaluation = 0.5 | lesson-learnt case status weighting = 1 | weighted lesson-learnt case status evaluation = 0.5 |

TABLE 4

| recorded lesson-learnt case | total score | proposed root cause | execution equipment |
|---|---|---|---|
| lesson-learnt case two | 30 | diamond blade | cutting equipment YND3 |
| lesson-learnt case one | 8.5 | arc discharge process | arc discharge equipment 282SFD13 |
| lesson-learnt case four | 11 | annealing process | N/A |
| lesson-learnt case three | 9 | Chemical Mechanical Polishing/ Planarization process | Chemical Mechanical Polishing/ Planarization equipment ATUNA01-5 |

TABLE 5 a comparison between an ongoing lesson-learnt case (not established yet)
and a recorded lesson-learnt case (e.g., the lesson-learnt case one)
total score corresponding to the lesson-learnt case one = 15

| feature parameter | feature evaluation | feature weighting | weighted feature evaluation |
|---|---|---|---|
| detective product symbol = Y009 | product symbol evaluation = 1 | product symbol weighting = 0.5 | weighted product symbol evaluation = 0.5 |
| detective layer symbol = AAA | layer symbol evaluation = 1 | layer symbol weighting = 0.5 | weighted layer symbol evaluation = 1 |
| detective defect code = scratch | defect code evaluation = 1 | defect code weighting = 3 | weighted defect code evaluation = 1 |
| detective defect map = arc | defect map evaluation = 1 | defect map weighting = 5 | weighted defect map evaluation = 1 |
| detective defect count = 3 | defect count evaluation = 3 | defect count weighting = 1 | weighted defect count evaluation = 3 |
| detective fault detection and classification = N/A | fault detection and classification evaluation = 1 | fault detection and classification weighting = 1 | weighted fault detection and classification evaluation = 1 |
| detective tool status = N/A | tool status evaluation = 0 | tool status weighting = 10 | weighted tool status evaluation = 0 |
| detective offline monitor data = N/A | offline monitor data evaluation = 0 | offline monitor data weighting = 7 | weighted offline monitor data evaluation = 0 |
| default lesson-learnt case status = indefinite | lesson-learnt case status evaluation = 0.5 | lesson-learnt case status weighting = 4 | weighted lesson-learnt case status evaluation = 0.5 |

To decide the appropriate feature weighting, the feature weighting (or feature initial weighting) for each feature evaluation maybe respectively set to 1 initially. For example, all of the product symbol weighting, the layer symbol weighting, the defect code weighting, the defect map weighting, the defect count weighting, the FDC weighting, the tool status weighting, the offline monitor data weighting, and the lesson-learnt case status weighting may be set to 1. In such a situation, the weighted product symbol evaluation, the weighted layer symbol evaluation, the weighted defect code evaluation, the weighted defect map evaluation, the weighted defect count evaluation, the weighted FDC evaluation, the weighted tool status evaluation, the weighted offline monitor data evaluation, the weighted lesson-learnt case status evaluation may then change to 1 (1=1*1), 1 (1=1*1), 1 (1=1*1), 1 (1=1*1), 3 (3=1*3), 1 (1=1*1), 0 (0=1*0), 0 (0=1*0), 0.5 (0.5=1*0.5) respectively.

A total score corresponding to a lesson-learnt case is calculated by summing all the weighted feature evaluations as indicated in Step 208. For example, the total score corresponding to the (recorded) lesson-learnt case one may equal 8.5 in this case. The rankings of all the lesson-learnt cases are calculated according to their corresponding total scores respectively in Step 210. For example, the lesson-learnt case two earns higher scores, and the most suspected root cause may be arc discharge process.

The most suspected root cause judged by the assessment system 10 (according to the lesson-learnt case two) may be compared to a standard answer, which may be real situation or may be found according to the manual inspection with human eyes. In some embodiments, matching values between proposed root causes judged by the assessment system 10 and the standard answer are calculated based on tool, stage, module, or product information so as to determine the pattern feature weightings. In some embodiments, feature weightings maybe calculated by means of a weighting analysis method. In some embodiments, feature weightings maybe determined by executing a predetermined statistical analysis such as a linear regression algorithm, a multi-linear regression algorithm, or linear algebra. In this way, the at least one feature initial weighting may be changed to the at least one feature weighting shown in Table 5 respectively.

In some embodiments, an assessment method may be performed manually. For example, FIG. 4 is a flowchart of an assessment method performed manually according to an example of the present invention. The assessment method 40 includes following steps:

Step 400: Start.

Step 402: Manually collecting on-site data for at least one defect detected on an object when the at least one defect occurs.

Step 404: Manually analyzing the on-site data to determine a suspected root cause.

Step 406: Manually issuing an alert about the suspected root cause, wherein the suspected root cause indicates why the at least one defect occurs.

Step 408: Manually notifying appropriate personnel with the alert.

Step 410: End.

As set forth above, because the assessment method 40 is performed manually, it might require more time to complete notification if compared with the assessment method 20 in automatic. Accordingly, cycle time may increase. In addition, subsequent fabrication processes may be impacted, and the accuracy drops.

In summary, the assessment system 10 of the present invention adopts feature extraction to obtain feature parameter(s) and achieves data retrieval and data matching rapidly in big data analysis with the database stored in the storage device 110 of the assessment system 10. Detecting defects, analyzing the most suspected root cause(s) of the defects and notifying appropriate personnel automatically according to the assessment method 20 could result in preventing yield loss, improving cycle-time, minimizing the impact on subsequent fabrication processes, and increasing reliability and accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An assessment system, comprising:
    a storage device, for storing instructions of:
        extracting at least one feature parameter corresponding to at least one defect detected on an object respectively;
        determining at least one feature evaluation according to the at least one feature parameter respectively;
        weighting the at least one feature evaluation to calculate at least one weighted feature evaluation respectively;
        summing the at least one weighted feature evaluation for the object to calculate at least one total score corresponding to at least one lesson-learnt case; and
        ranking the at least one total score corresponding to the at least one lesson-learnt case to find out, for the object, a suspected root cause corresponding to one of the at least one lesson-learnt case with higher priority, wherein the object is a wafer; and
    a processing circuit, coupled to the storage device, configured to execute the instructions stored in the storage device.

2. The assessment system of claim 1, wherein the storage device further stores the instruction of:
    automatically issuing an alert about the suspected root cause, wherein the suspected root cause indicates why the at least one defect occurs.

3. The assessment system of claim 1, wherein the at least one feature parameter corresponding to the at least one defect comprises at least one of a detective product symbol, a detective layer symbol, a detective defect code, a detective defect map, a detective defect count, a detective fault detection and classification (FDC), a detective tool status, a detective offline monitor data, and a detective lesson-learnt case status.

4. The assessment system of claim 3, wherein the detective product symbol is related to an integrated circuit design of the wafer, the detective layer symbol is related to which layer of the wafer the at least one defect is located in, the detective defect code is related to at least one type of the at least one defect, the detective defect map is related to at least one shape or at least one size of the at least one defect, the detective defect count is related to a number of the at least one defect, the detective tool status is related to at least one status of at least one equipment used to manufacture the wafer, the detective FDC is related to at least one sensor used to monitor the at least one equipment, the detective offline monitor data is related to offline monitoring of at least one test sample, and the detective lesson-learnt case status is related to at least one diagnosis accuracy of at least one lesson-learnt case.

5. The assessment system of claim 1, wherein each of the at least one feature evaluation is related to a similarity between one of the at least one feature parameter and one of at least one default feature parameter respectively.

6. The assessment system of claim 1, wherein the at least one feature evaluation is multiplied by at least one feature weighting to calculate the at least one weighted feature evaluation respectively, and the at least one feature weighting is determined according to a linear regression algorithm respectively.

7. The assessment system of claim 6, wherein at least one feature initial weighting is set to 1 respectively and changed to the at least one feature weighting according to a linear regression algorithm respectively.

8. The assessment system of claim 6, wherein at least one matching value between at least one proposed root cause and a standard answer is calculated to determine the at least one feature weighting respectively.

9. The assessment system of claim 1, wherein the at least one feature parameter corresponding to the at least one defect and the suspected root cause are established as a new lesson-learnt case, and the new lesson-learnt case is stored in the storage device.

10. The assessment system of claim 1, further comprising:
    an imaging device, configured to image the object for the processor circuit to process.

11. The assessment system of claim 1, wherein the suspected root cause is compared with a possible root cause determined by manual inspection with human eyes to calculate a determination accuracy, at least one of the at least one feature parameter corresponding to the suspected root cause is updated according to the determination accuracy, the detective defect code indicates that one of the at least one defect is a scratch or an impurity, the detective defect map indicates that one of the at least one defect is an arc or a triangle, or a distance between two opposing edges of one of the at least one defect, and the detective tool status indicates whether the at least one equipment is going to be repaired or has just been maintained, or a type of a maintenance event.

12. An assessment method, comprising:
    extracting at least one feature parameter corresponding to at least one defect detected on an object respectively;
    determining at least one feature evaluation according to the at least one feature parameter respectively;

weighting the at least one feature evaluation to calculate at least one weighted feature evaluation respectively;

summing the at least one weighted feature evaluation for the object to calculate at least one total score corresponding to at least one lesson-learnt case; and ranking the at least one total score corresponding to the at least one lesson-learnt case to find out, for the object, a suspected root cause corresponding to one of the at least one lesson-learnt case with higher priority, wherein the object is a wafer.

13. The assessment method of claim 12, further comprising:

automatically issuing an alert about the suspected root cause, wherein the suspected root cause indicates why the at least one defect occurs.

14. The assessment method of claim 12, wherein the at least one feature parameter corresponding to the at least one defect comprises at least one of a detective product symbol, a detective layer symbol, a detective defect code, a detective defect map, a detective defect count, a detective fault detection and classification (FDC), a detective tool status, a detective offline monitor data, and a detective lesson-learnt case status.

15. The assessment method of claim 12, wherein each of the at least one feature evaluation is related to a similarity between one of the at least one feature parameter and one of at least one default feature parameter respectively.

16. The assessment method of claim 12, wherein the at least one feature evaluation is multiplied by at least one feature weighting to calculate the at least one weighted feature evaluation respectively, and the at least one feature weighting is determined according to a linear regression algorithm respectively.

17. The assessment method of claim 16, wherein at least one feature initial weighting is set to 1 respectively and changed to the at least one feature weighting according to a linear regression algorithm respectively.

18. The assessment method of claim 16, wherein at least one matching value between at least one proposed root cause and a standard answer is calculated to determine the at least one feature weighting respectively.

19. The assessment method of claim 12, wherein the at least one feature parameter corresponding to the at least one defect and the suspected root cause are established as a new lesson-learnt case, and the new lesson-learnt case is stored in a database.

20. The assessment method of claim 12, wherein an imaging device is configured to image the object to detect the at least one defect.

* * * * *